United States Patent
Sedarat et al.

(10) Patent No.: US 11,349,694 B1
(45) Date of Patent: May 31, 2022

(54) CODE MULTIPLEXING FOR ASYMMETRIC COMMUNICATION

(71) Applicant: Ethernovia Inc., San Jose, CA (US)

(72) Inventors: Hossein Sedarat, San Jose, CA (US); Ramin Shirani, Morgan Hill, CA (US); Roy T. Myers, Jr., Santa Clara, CA (US); Darren S. Engelkemier, Menlo Park, CA (US)

(73) Assignee: Ethernovia Inc., San Jose, CA (US)

( * ) Notice: Subject to any disclaimer, the term of this patent is extended or adjusted under 35 U.S.C. 154(b) by 0 days.

(21) Appl. No.: 17/077,138

(22) Filed: Oct. 22, 2020

Related U.S. Application Data (60) Provisional application No. 62/960,555, filed on Jan. 13, 2020.

(51) Int. Cl.
*H04L 27/00* (2006.01)
*H04L 27/233* (2006.01)
*H04L 27/26* (2006.01)

(52) U.S. Cl.
CPC ...... *H04L 27/2337* (2013.01); *H04L 27/0014* (2013.01); *H04L 27/2605* (2013.01); *H04L 2027/0018* (2013.01)

(58) Field of Classification Search
CPC ........ H04B 1/713; H04B 7/005; H04B 14/04; H04J 3/06; H04J 3/10; H04L 12/26; H04L 25/03; H04L 25/497; H04L 27/00; H04L 27/20; H04L 27/36; H04L 27/0014; H04L 27/2337; H04L 27/2605
USPC ........ 370/201, 278, 350; 375/133, 219, 260, 375/262, 267, 295, 308, 316, 346
See application file for complete search history.

(56) References Cited

U.S. PATENT DOCUMENTS

| | | | |
|---|---|---|---|
| 8,270,389 B2 * | 9/2012 | Parnaby | H04L 12/12 370/350 |
| 10,333,567 B1 * | 6/2019 | Luo | H04L 1/0057 |
| 2019/0372822 A1 * | 12/2019 | Woodsum | H04L 5/06 |

* cited by examiner

*Primary Examiner* — Shawkat M Ali
(74) *Attorney, Agent, or Firm* — Schwegman Lundberg & Woessner, P.A.

(57) ABSTRACT

Various embodiments provide for data transmission using modulated carrier signals to carry data, where the carrier signal comprises a predetermined sequence of symbols. An embodiment can be used in such applications as data network communications between sensors (e.g., cameras, motion, radar, etc.) and computing equipment within vehicles (e.g., smart and autonomous cars).

20 Claims, 8 Drawing Sheets

CODE MULTIPLEXING FOR ASYMMETRIC COMMUNICATION

CROSS-REFERENCE TO RELATED APPLICATION

This application claims priority to and the benefit of U.S. Provisional Patent Application No. 62/960,555, filed on Jan. 13, 2020, which is incorporated herein by reference.

TECHNICAL FIELD

Embodiments described herein relate to data communications and, more particularly, to systems, methods, devices, and instructions for data transmissions using code multiplexing.

BACKGROUND

While Ethernet physical layer standards typically specify symmetric communication systems (e.g., one that supports identical data rate in both directions of a data link, such as 10 Gbps in both directions), certain applications are better suited to use an asymmetric Ethernet-based communication system, where the data rate in one direction of a given data link between two devices is different from the rate in the other direction of the given data link. Examples of such applications include, without limitation: applications where data in one direction can fluctuate and demand varying data throughput with time; a network-attached display that consumes a large amount of data but may generate only limited amounts of data; and a network-attached camera sensor that generates large amount of data and needs very limited control input. For instance, a camera sensor being used by an automobile can send multi-gigabits/s data (e.g., camera captures multiple frames a second) and would only need to receive very little data to control operation of the camera sensor (e.g., basic controls to zoom, pan, etc.). In such an instance, the camera sensor can establish and use an asymmetric data link with a processor of the automobile, where the data rate from the processor to the camera sensor is at a lower than the data rate from the camera to the processor. In doing so, the processor (as a data transmitter) and the camera (as a data receiver) can use less power than it would otherwise would if a symmetric data link was used instead.

Some existing Ethernet standards define a low power feature known as Energy-Efficient Ethernet (EEE), which can provide significant power savings when there is no data to transmit between devices. For some implementations, EEE is defined as an asymmetric data communications scheme in which a data transmitter of a device can be in low-power idle (LPI) mode when it has no data to send and while its EEE data link-partner is transmitting data in normal mode. While in LPI mode, a number of components in the transmitter or receiver implementing EEE may be shut down to save power. When the data transmitter of the device has data to send, the data transmitter can transition out of LPI mode and into normal mode (e.g., to facilitate data transmission as bursts of data). Generally, an upper layer network component of a transmitter-side device (e.g., application layer) decides whether there is no data to transmit on the transmitter-side device and instructs the physical layer (PHY) of the transmitter-side device to transition into (or transition out of) LPI mode accordingly.

Though EEE is currently available to lower power usage by devices during Ethernet-based communication, traditional EEE still has high peak power usage given that while in LPI mode, receiver components of an EEE receiving device generally continue to operate (e.g., remain active) so that the EEE receiving device can monitor for one or more signals, such as Alert signals (from an EEE transmitting device to the EEE receiving device) to signal a transition from LPI mode to normal mode. In applications that involve high data speeds, such as 10 Gbps, the power consumption by receiving components while monitoring for the signal (e.g., Alert signal) while in LPI mode can be substantial. Additionally, with traditional EEE, devices send data transmit data in bursts during normal modes and transition from LPI to normal mode often, which results in frequent data overhead (e.g., sleep time and wake time). This can be detrimental when the amount of data being transmitted from EEE transmitting device to the EEE receiving device is not large (e.g., control data from a processor to a camera sensor within an automobile). Although the average power over LPI and burst of signal can be low, the peak power consumption can be high when data is transmitted in bursts at high data rates. During training and data transmission, max power consumption remains high, which can involve more complex and costly power systems (e.g., complex regulators). Furthermore, EEE does not offer any silicon cost reduction as an EEE transceiver that is designed for full speed symmetric communication.

BRIEF DESCRIPTION OF THE DRAWINGS

Various ones of the appended drawings merely illustrate example embodiments of the present disclosure and should not be considered as limiting its scope.

DETAILED DESCRIPTION

Various embodiments provide for using a carrier signal that comprises a predetermined sequence of symbols to implement data transmission by code multiplexing. Some embodiments described herein can be used in such applications as data network communications between sensors (e.g., cameras, motion, radar, etc.) and computing equipment within vehicles (e.g., smart and autonomous cars). For example, some embodiments can be used for data transmission between two physical layer devices, where first physical device transmits data to a second physical layer device at a first data rate (e.g., low data rate) using a set of modulated carrier signals, and where the first physical layer device receives data from the second physical layer device at a second data rate (e.g., high data rate, such as one based on a standard specification) that is higher than the first data rate (e.g., lower data rate is 1 Mbps and the high data rate is 10 Gbps). For instance, the first physical layer device can be coupled to (or form a part of) a sensor data aggregator, and the second physical layer device can be coupled to (or form a part of) a sensor. The first physical layer device of the sensor data aggregator can transmit sensor control data (e.g., to control sensor configuration) to the second physical layer of the sensor at the first data rate (e.g., low speed rate), and the second physical layer device of the sensor (e.g., camera sensor) can transmit sensor data (e.g., video data) to the first physical layer device of the sensor data aggregator at the second data rate (e.g., high speed rate).

Various embodiments provide for generating and transmitting one or more modulated carrier signals from one physical layer device to another physical layer device, where the one or more modulated carrier signals to carry data from the one physical layer device to the other physical layer device. The transmitted one or more modulated carrier signals can comprise a consecutive series of modulated carrier signals.

According to various embodiments, each modulated carrier signal is generated by modulating a carrier signal to carry a different individual bit of data (e.g., sensor control data, application data, etc.) that is being transmitted from one physical layer device to another physical layer device. For some embodiments, a carrier signal being modulated comprises a predetermined (e.g., known) sequence of symbols. Each symbol of the predetermined sequence of symbols can comprise, for example, a PAM2 symbol or a PAM4 symbol. Additionally, the carrier signal can comprise high frequency signal. For various embodiments, the predetermined sequence of symbols is known by both physical layer devices, thereby enabling the transmitting physical layer device to generate one or more modulate carrier signals to carry data and enabling the receiving physical layer device to demodulate the one or more modulated carrier signals to extract data from the one or more modulated carrier signals. In particular, the receiving physical layer can demodulate one or more modulated carrier signals (received from the transmitting physical layer device) by cross-correlating the one or more modulated carrier signals with a predetermined sequence of symbols of the carrier signal, which is known by the receiving physical layer device. For some embodiments, a receiving physical layer device comprises a filter that enables the receiving physical layer device to cross-correlate one or more modulated carrier signal received from a transmitting physical layer device. In this case, the output of the cross-correlating filter can be down-sampled to generate one data symbol per one frame of carrier signal. For some embodiments, the combination of the cross-correlating filter and the down-sampler is implemented through a poly-phase filter.

Depending on the embodiment, the predetermined sequence of symbols can comprise a pseudo-random sequence of symbols, such as a pseudo-random binary sequence (PRBS) (e.g., PRBS8, which comprises a known sequence of 255 symbols). For instance, the carrier signal can comprise PRBS8, the transmitted one or more modulated carrier signals can comprise consecutive transmission of PRBS8 where each instance of PRBS8 is modulated to carry data from one physical layer device to another physical layer device. For some embodiments, modulating a carrier signal to carry a data bit of zero comprises leaving the carrier signal unchanged/unmodified, while modulating the carrier signal to carry a data bit of one comprises modifying the carrier signal in some manner. Alternatively, for some embodiments, modulating a carrier signal to carry a data bit of one comprises leaving the carrier signal unchanged/unmodified, while modulating the carrier signal to carry a data bit of zero comprises modifying the carrier signal in some manner. Depending on the embodiment, modifying the carrier signal can comprise at least one of reversing the polarity of the carrier signal or multiplying the signal by a value (e.g., −1).

For some embodiments, the modulated carrier signal carries more than one bit of data. For instance, where a 4-level modulation (e.g., PAM4) is being used, two bits of data modulate the amplitude of the signal by a multiplying factor of −1, −⅓, +⅓, or +1.

For some embodiments, modulated carrier signals are transmitted from one physical layer device to another physical layer device when data is being transmitted. One or both the physical layer devices enter low power mode (e.g., similar to lower power mode of EEE) transmit idle symbols when data is not being transmitted.

For various embodiments, a number of symbols in a predetermined sequence of symbols determines a spreading factor with respect to every data bit transmitted by one or more modulated carrier signals (e.g., by how much every data bit is spread over a number of symbols). The spreading factor can determine the length of carrier signal and can determine a data rate achieved by transmitting one or more modulated carrier signals.

According to various embodiments, a spreading factor of a transmitting physical layer device results in a spreading gain at a receiving physical layer device. For some embodiments, the spreading gain at the receiving physical layer device results in a signal-to-ratio (SNR) gain of the receiving physical layer device. For example, the SNR gain can be proportional to the spreading gain, where the SNR gain can increase with an increase in the spreading gain. For some embodiments, a SNR gain (from the spreading gain) results from a receiving physical layer device cross-correlates one or more modulated carrier signals (received from a transmitting physical layer device) with a predetermined sequence of symbols of a carrier signal. Due to the randomness of noise (from the communication channel) in modulated carrier signals received by the receiving physical layer device, during cross-correlation the noise is uncorrelated with the predetermined sequence of symbols and is canceled out, which can result in SNR gain at the receiving physical layer device. For example, where cross-correlation is achieved by multiplying symbols of the one or more modulated carrier signals by symbols of the carrier signal, and accumulating resulting values, the noise in the modulated carrier signals can be averaged out, which results in the SNR gain. As an example, where the baud rate is 12.5 GHz and a predetermined sequence of symbols of a carrier signal comprises 125 (e.g., PAM2) symbols, an embodiment can have a spreading factor of 125 (125 symbols transmitted per a single data bit communicated from one physical layer device to another physical layer device), can achieve a data rate of 100 Mbps, and can achieve such a date rate with a minimum input SNR of approximately 0 dB (which can mean that the modulated carrier signals can be demodulated even when there is a lot of noise from the communication channel). Where a predetermined sequence of symbols of a carrier signal comprises PRBS8, the 255 PAM2 symbols of PRBS8 can result in a spreading factor of 255 (255 symbols per single data bit communicated from one physical layer device to another physical layer device).

For some embodiments, achieving SNR gain at a receiving physical layer device (that is receiving modulated carrier signals from a transmitting physical layer device) can obviate the need for the receiving physical layer device to implement a transmitter (e.g., for data transmissions to the transmitting physical layer device) with an echo canceller, as any echo received/observed by the receiving physical layer device can be considered noise that is canceled out by cross-correlation of the modulated carrier signals as described herein.

By use of various embodiments, two physical layer devices can facilitate a power-efficient data communication (e.g., asymmetric data communication) by using modulated carrier signals to implement code multiplexing. An embodiment can enable a physical layer device to transmit data at a lower data rate using modulated carrier signals, and to do so with a simple receiver with partial or no echo canceller and equalizer. Any residual echo or remaining inter-symbol interference can be tolerated because of resiliency to low input SNR. Similarly, the analog front-end of the transceiver can be simplified with lower linearity and noise requirement. In doing so, some embodiments can enable use of a simplified receiver (for receiving modulated carrier signals) that has lower average power consumption, has reduced physical (PHY) layer complexity, has reduced cost PHY layer, or some combination thereof. Additionally, an embodiment can enable a physical layer device to receive modulated carrier signals (from another physical layer device) that carry data, and to do so without need for the physical layer device to perform equalizer training or echo canceller training.

Different embodiments can use different carrier signals, and the choice of carrier signals can determine one or more properties or complexity of an embodiment (e.g., the complexity of the receiver of an embodiment). For instance, where the carrier signal used by an embodiment can comprise carrier symbols that are all identical and have only one of two values (e.g., +/−1, such as for a PAM2 carrier signal), the modulated carrier signals transmitted to a receiver is effectively a low data-rate (e.g., baud-rate) signal with most of its power limited to low frequencies. With this choice of carrier signal, the receiver can cross-correlate a modulated carrier signal (received from a transmitter) by a cross-correlator that serves as an averaging element, and that comprises a low-pass filter (e.g., in an analog domain) coupled to a sampler (e.g., down-sampler that samples at a low data rate). With this choice of carrier signal, the communication system can operate at different data rates in each direction, which can simplify the complexity of the (low data-rate) transmitter and (low data-rate) receiver as the clock frequency and analog-digital conversion rates can be lower in comparison to the higher data-rate transmitter and receiver. In another instance, the carrier signal used by an embodiment can comprise carrier symbols that are not constant values and toggle value frequently, which can provide sufficient high frequency content in the carrier signal to allow a receiver to extract high resolution information. Such a carrier signal can be useful for an embodiment where a low data-rate receiver is configured as slave and configured to extract high resolution timing information from a far-end master transmitter. For such an embodiment, a carrier signal comprising carrier symbols having one of two constant values (e.g., +/−1) may not provide enough high frequency content for the receiver to extract timing information with high resolution.

Some embodiments modulate each data bit of a sequence of bits using a different carrier signal selected from a plurality of carrier signals. Such embodiments can be used to avoid or mitigate situations where the power spectral density of a transmitted, modulated carrier signal exhibits peaking in periodic frequency intervals, which may occur when the same carrier signal is used for modulating every data bit. For some embodiments, the plurality of carrier signals used is pre-determined or otherwise known by both the transmitter and the receiver. Additionally, for some embodiments, the order in which carrier signals are selected and used in modulation are pre-determined or otherwise known by both the transmitter and the receiver. According to some embodiments, the plurality of carrier signals is generated by generating a predetermined sequence of symbols at both the transmitter and the receiver (e.g., a long PRBS, such as PRBS33), and use each consecutive frame (e.g., each consecutive 125-bit long frame or subsequence in PRBS33) of the predetermined sequence of symbols as a different carrier signal in the plurality of carrier signals. Additionally, the order of the consecutive frames of the generated predetermined sequence of symbols can determine the order in which the consecutive frames are used as different carrier signals. The generation of the predetermined data pattern at both the transmitter and receiver can be synchronous.

Reference will now be made in detail to embodiments of the present disclosure, examples of which are illustrated in the appended drawings. The present disclosure may, however, be embodied in many different forms and should not be construed as being limited to the embodiments set forth herein.

Figure 1:
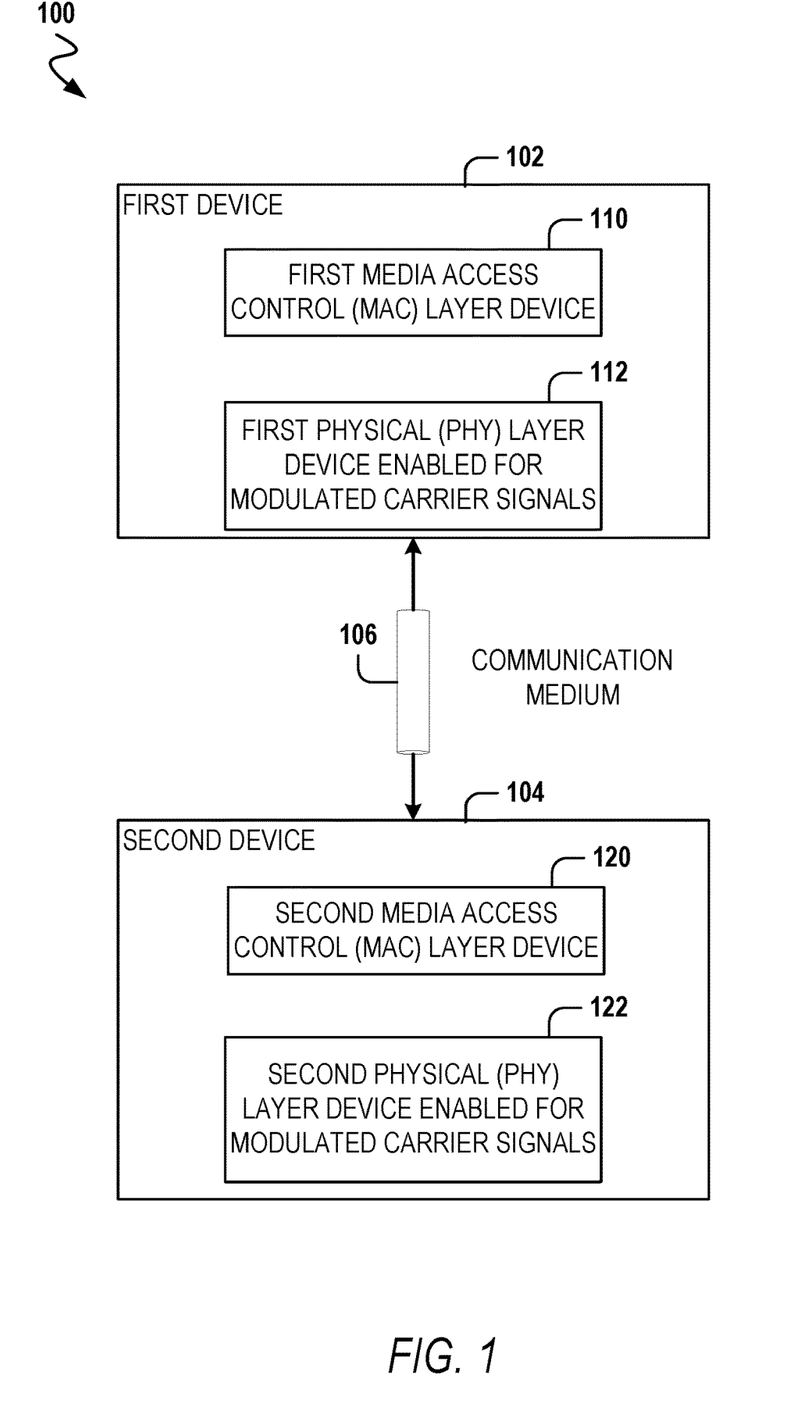
FIG. 1 is a block diagram illustrating an example system that comprises a first device and a second device enabled for data transmissions using modulated carrier signals to implement code multiplexing, in accordance with some embodiments.

FIG. 1 is a block diagram illustrating an example system 100 that comprises a first device 102 and a second device 104 enabled for data transmissions (e.g., lower data rate transmissions) using modulated carrier signals to implement code multiplexing, in accordance with some embodiments. Depending on the embodiment, the first device 102 can be implemented (at least in part) by machine 800 of FIG. 8, and the second device 104 can be implemented (at least in part) by machine 800 of FIG. 8. As shown, the communication medium 106 operatively couples the first device 102 to the second device 104, where the communication medium 106 can support a data link (e.g., an asymmetric data link). The communication medium 106 can comprise a wire (e.g., twisted pair) that permits transmission of an analog signal. As also shown, the first device 102 comprises a first media access control (MAC) layer device 110, and a first physical (PHY) layer device 112 enabled for modulated carrier signals as described herein, and the second device 104 comprises a second media access control (MAC) layer device 120, and a second physical (PHY) layer device 122 enabled for modulated carrier signals as described herein.

Each of the first physical layer device 112 and the second physical layer device 122 can implement features or methodologies described herein with respect to various embodiments. The first media access control (MAC) layer device 110 represents one or more components of the first device 102 that implement or enable a MAC layer of a network stack of the first device 102, and the first physical (PHY) layer device 112 represents one or more components of the first device 102 that implement or enable a PHY layer of a network stack of the first device 102. The second media access control (MAC) layer device 120 represents one or more components of the second device 104 that implement or enable a MAC layer of a network stack of the second device 104, and the second physical (PHY) layer device 122 represents one or more components of the second device 104 that implement or enable a PHY layer of a network stack of the second device 104.

Though not illustrated, in certain applications, the first device 102 can be communicatively coupled to one or more other devices (e.g., one or more sensor devices) that generate or otherwise provide the first device 102 with data (e.g., data packets) that need to be transmitted to the second device 104. Accordingly, via the first physical layer device 112, the first device 102 can transmit the data received from the one or more other devices to the second device 104 (e.g., using a high data rate, such as one based on IEEE 802.11ch). Depending on the embodiment, the one or more devices can comprise one or more sensors or other peripheral devices that generate or provide video data or radar/lidar data according to a data standard. The second physical layer device 122 of the second device 104 can receive the data from the first device 102. Subsequently, the data received at the second device 104 can be processed by a processor that is part of, or operatively coupled to, the second device 104. For example, the received data can comprise video data from a camera sensor device that can be processed at the second device 104. The processor of the second device 104 can include, without limitation, an electronic control unit (ECU), a central processing unit (CPU), or a graphic processing units (GPU). Via the second physical layer device 122, the second device 104 can transmit data to first device 102 using one or more modulated carrier signals as described herein, which can achieve a low data rate transmission to from the second device 104 to the first device 102. The data carried by the modulated carrier signals can comprise, for example, control information for a sensor device (e.g., camera sensor device control information) coupled to the first device 102.

For various embodiments, the second physical layer device 122 enables the second device 104 to transmit modulated carrier signals to carry data from the second device 104 to the first device 102 (e.g., at a low data rate) using a simple receiver with simple analog front-end and no or partial echo cancel and equalization. Use of the second physical layer device 122 can enable the second device 104 to use a simpler transmitter that uses less power than other physical layer devices (e.g., by transmitting at lower power and/or with higher nonlinearity and noise). For various embodiments, the first physical layer device 112 enables the second device 104 to receive data from the second device 104 (e.g., at a low data rate) using modulated carrier signals. Use of the first physical layer device 112 can enable the first device 102 to reduce its average power consumption, use a less complex physical layer, and use a less costly physical layer.

Figure 2:
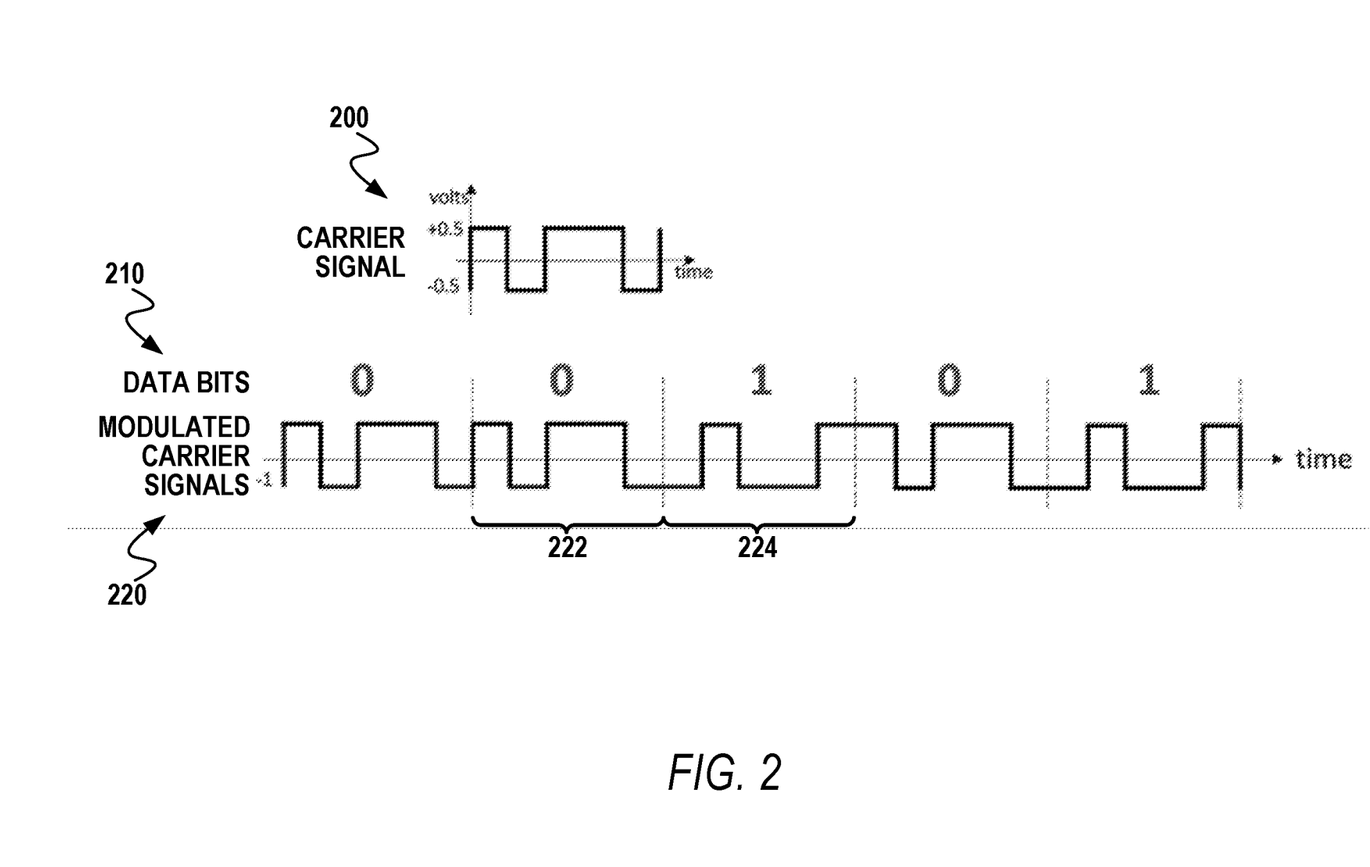
FIG. 2 is a diagram illustrating an example of a series of modulated carrier signals generated by modulating an example carrier signal to carry data, in accordance with some embodiments.

FIG. 2 is a diagram illustrating an example of a series of modulated carrier signals 220 generated by modulating an example carrier signal 200 to carry data, in accordance with some embodiments. In FIG. 2, the carrier signal comprises a predetermined sequence of five symbols. As shown, each symbol has a voltage value of +0.5 volts or −0.5 volts. For some embodiments, each symbol of the carrier signal 200 is a PAM2 symbol. The carrier signal 200 is modulated to generate the series of modulated carrier signals 220 to carry the data bit sequence 210 that comprises '00101': Where a portion (e.g., modulated carrier signal 222) of the series of modulated carrier signals 220 carries a data bit representing '0' of the data bit sequence 210, the portion remains unmodified/unchanged. Where a portion (e.g., modulated carrier signal 224) of the series of modulated carrier signals 220 carries a data bit representing '1' of the data bit sequence 210, the portion is modified (e.g., here, the polarity is inverted). As described herein, for some embodiments, the reverse can be used (e.g., modify carrier signal to represent a data bit of '0', and leaving the carrier signal unchanged to represent a data bit of '1').

Figure 3:
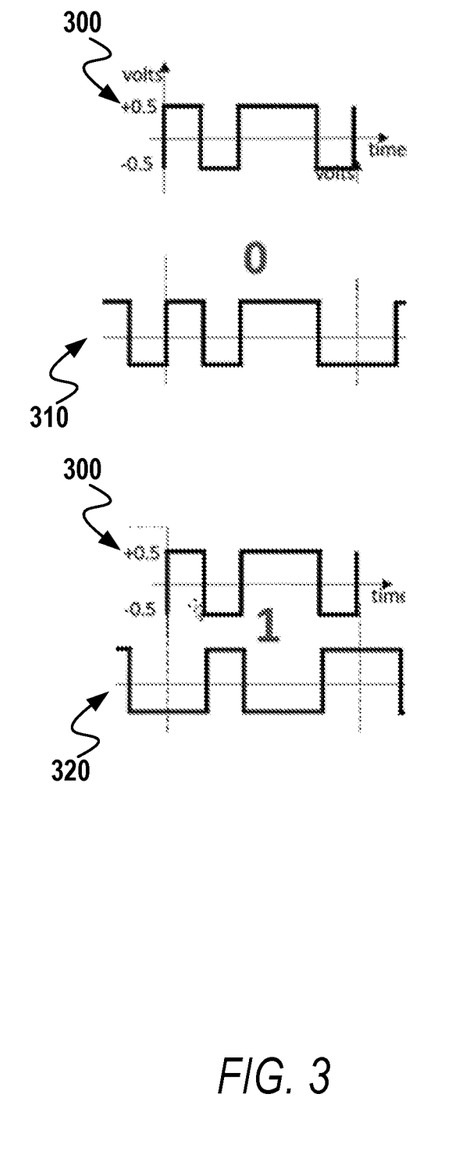
FIG. 3 is a diagram illustrating an example of portions of a modulated carrier signal being cross-correlated with a predetermined sequence of symbols of a carrier sequence, in accordance with some embodiments.

FIG. 3 is a diagram illustrating an example of portions of a modulated carrier signal being cross-correlated with a predetermined sequence of symbols of a carrier sequence, in accordance with some embodiments. In particular, a carrier signal 300 comprises a predetermined sequence of five symbols, where each symbol (e.g., PAM2 symbol or a PAM4 symbol) ranges between +0.5 volts and −0.5 volts. Each of modulated carrier signal 310 and modulated carrier signal 320 represents different portions of a series of modulated carrier signals, where the modulated carrier signal 310 represents a data bit of '0' and the modulated carrier signal 320 represents a data bit of '1.' For some embodiments, cross-correlation of the carrier signal 300 with the modulated carrier signal 310 comprises multiplying each of the five symbols of the carrier signal 300 with its corresponding symbol in the modulated carrier signal 310 and accumulating the value (e.g., accumulating the gain). Here, the modulated carrier signal 310 is unchanged (e.g., to represent a data bit '0') and, accordingly, the cross-correlation of the modulated carrier signal 310 with the carrier signal 300 can result in an accumulated value (e.g., gain) of +5. The modulated carrier signal 320 is modified (e.g., inverted polarity to represent a data bit '1') and, accordingly, the cross-correlation of the modulated carrier signal 320 with the carrier signal 300 can result in an accumulated value (e.g., gain) of −5. As described herein, for some embodiments, the more symbols in a predetermined sequence of symbols of a carrier signal, the larger the gain that results during cross-correlation.

Figure 4:
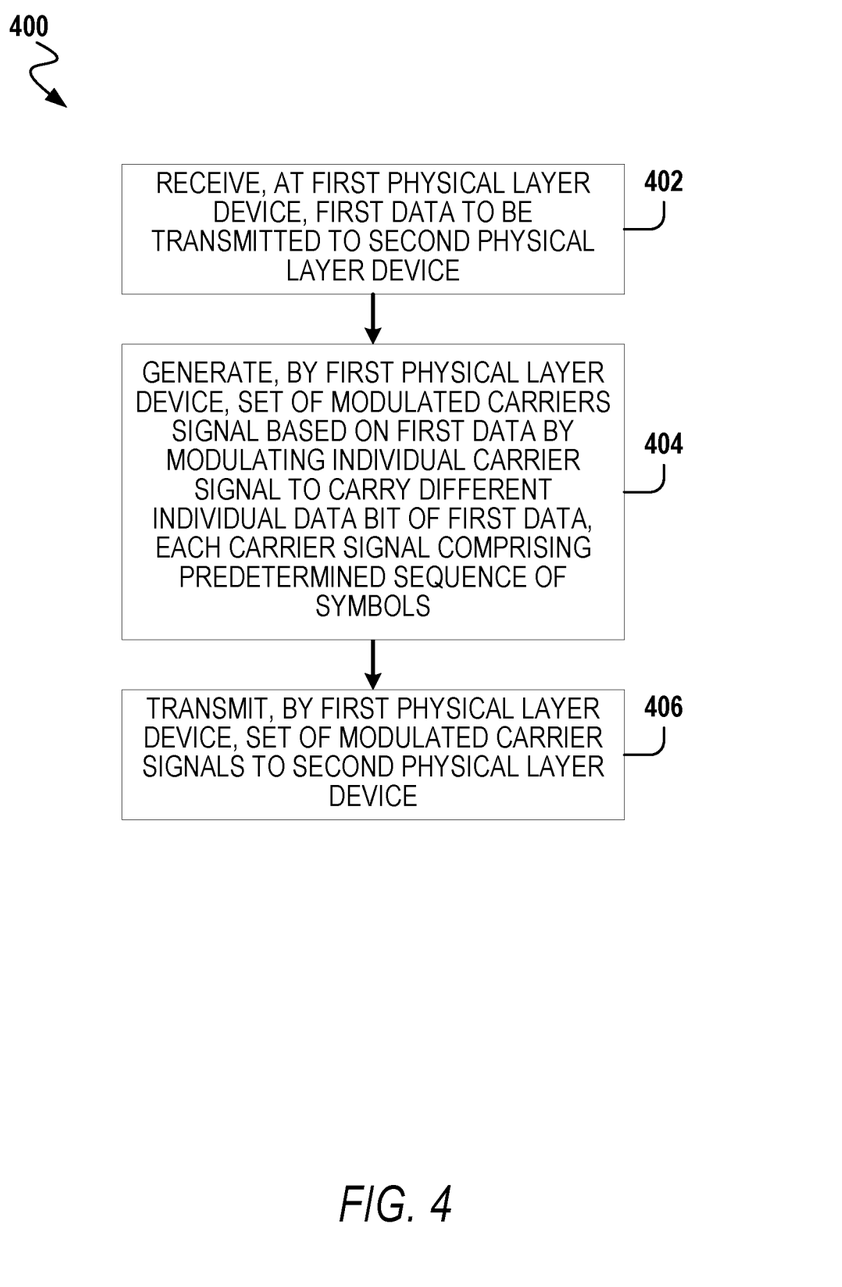
FIGS. 4 and 5 are flowcharts illustrating example methods for data transmission using modulated carrier signals to implement code multiplexing, in accordance with some embodiments.
Figure 5:
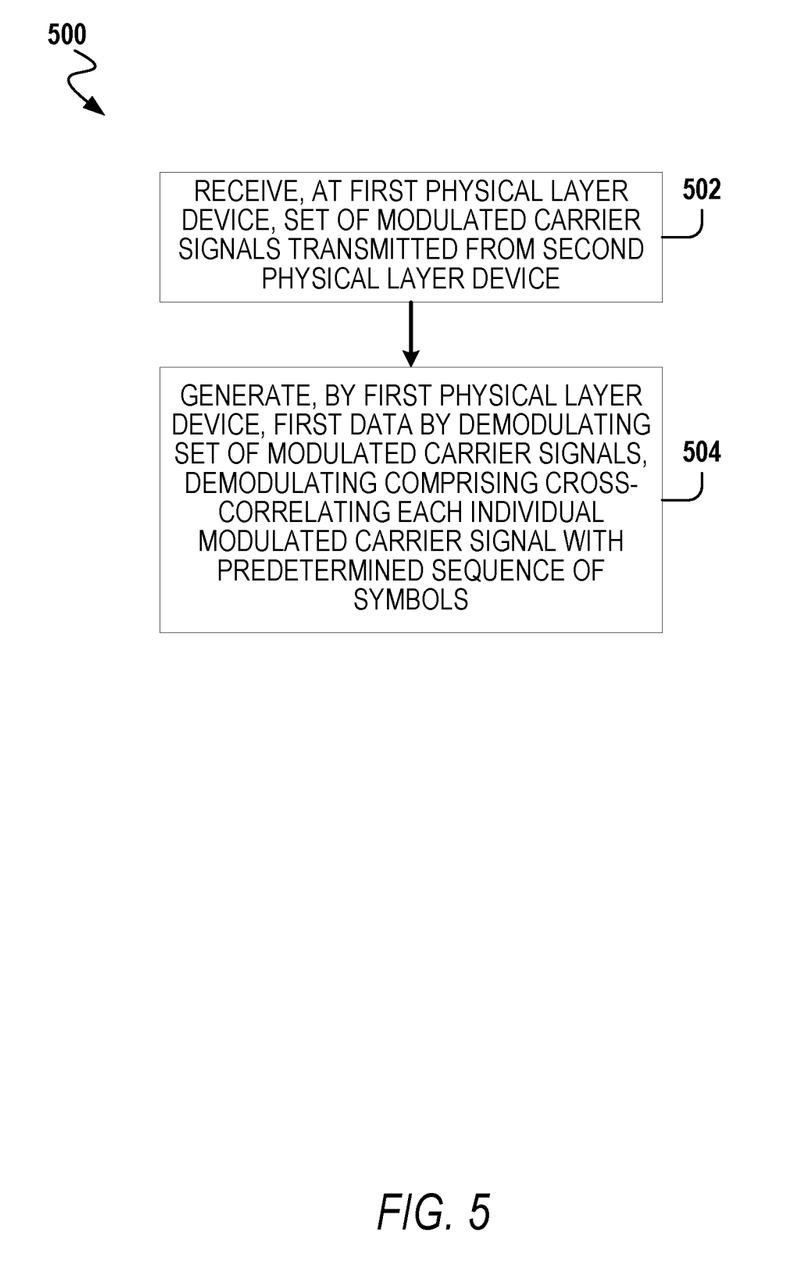

FIGS. 4 and 5 are flowcharts illustrating example methods 400, 500 for data transmission using modulated carrier signals to implement code multiplexing, in accordance with some embodiments. It will be understood that example methods described herein may be performed by various circuit components, including for example addition circuits, comparators, slicers, digital-to-analog convertors (DAC), analog-to-digital convertors (ADC), delay components, feed-forward equalizers, echo cancellers, crosstalk cancellers, wrap components, precoders, DFEs and the like. For instance, the methods 400, 500 may be performed by the first physical (PHY) layer device 112 or the second physical (PHY) layer device 122 described with respect to FIG. 1. Depending on the embodiment, an operation of an example method described herein may involve intervening operations not shown. Additionally, though the operations of example methods may be depicted and described in a certain order, the order in which the operations are performed may vary among embodiments, including performing certain operations in parallel.

Referring now to FIG. 4, at operation 402, a first physical layer device (e.g., 112) receives first data to be transmitted to a second physical layer device (e.g., 122) over a data transmission medium. For some embodiments, the first data comprises user data or application data, such as sensor data generated by a sensor device (e.g., camera senor). In certain applications, the second physical layer device can be associated with (e.g., coupled or form a part of) a sensor device, and the first physical layer device can be associated with (e.g., coupled or form a part of) a sensor data aggregator device. Where the second device 104 comprises a sensor device, the first data to be transmitted to the second physical layer device can comprise sensor control data for the sensor device.

Continuing with operation 404, the first physical layer device (e.g., 112) generates a set of modulated carrier signals based on the first data by modulating each individual carrier signal in a set of carrier signals to carry a different individual data bit of the first data received at operation 402. For some embodiments, each individual carrier signal in the set of carrier signals comprises a predetermined sequence of symbols, and the predetermined sequence of symbols is known by the second physical layer device (e.g., 122). The predetermined sequence of symbols can comprise, for example, a PRBS (e.g., PRBS8). Additionally, the first physical layer device can comprise an echo canceller that comprises a set of poly-phase filters, where the set of poly-phase filters operates based on a set of coefficients. According to some embodiments, modulating each individual carrier signal in the set of carrier signals to carry a different individual data implements code multiplexing (which can be used in asymmetric communication as described herein).

For some embodiments, modulating each individual carrier signal in the set of carrier signals to carry the different individual data bit of the first data comprises modifying an individual predetermined sequence of symbols, of the individual carrier signal, based on whether the individual predetermined sequence of symbols is to carry an individual data bit of zero (0) from the first data or an individual data bit of one (1) from the first data. Depending on the embodiment, the modifying the individual predetermined sequence of symbols can comprise reversing a polarity of the individual predetermined sequence of symbols, or can comprise multiplying the individual predetermined sequence of symbols by a negative value (e.g., −1).

For various embodiments, modifying an individual predetermined sequence comprises: determining whether the individual predetermined sequence of symbols is to carry the individual data bit of zero from the first data or the individual data bit of one from the first data; and in response to determining that the individual predetermined sequence of symbols is to carry the individual data bit of zero, leaving the individual predetermined sequence of symbols unmodified/unchanged (compared to the predetermined sequence of symbols of the carrier signal). Alternatively, for modifying an individual predetermined sequence comprises: determining whether the individual predetermined sequence of symbols is to carry the individual data bit of zero from the first data or the individual data bit of one from the first data; and in response to determining that the individual predetermined sequence of symbols is to carry the individual data bit of zero, modifying the individual predetermined sequence of symbols.

For various embodiments, modifying an individual predetermined sequence comprises: determining whether the individual predetermined sequence of symbols is to carry the individual data bit of zero from the first data or the individual data bit of one from the first data; and in response to determining that the individual predetermined sequence of symbols is to carry the individual data bit of one, leaving the individual predetermined sequence of symbols unmodified. Alternatively, for modifying an individual predetermined sequence comprises: determining whether the individual predetermined sequence of symbols is to carry the individual data bit of zero from the first data or the individual data bit of one from the first data; and in response to determining that the individual predetermined sequence of symbols is to carry the individual data bit of one, modifying the individual predetermined sequence of symbols by inverting its polarity.

Eventually, at operation 406, the first physical layer device (e.g., 112) transmits the set of modulated carrier signals (e.g., transmitted as a consecutive series of modulated carrier signals) to the second physical layer device (e.g., 122). For some embodiments, the set of modulated carrier signals is transmitted as a high frequency signal. Additionally, for some embodiments, operations 404 and 406 can be performed as a single operation.

Referring now to FIG. 5, at operation 502, a first physical layer device (e.g., 112) receives a set of modulated carrier signals transmitted from a second physical layer device (e.g., 112).

Continuing with operation 504, the first physical layer device (e.g., 122) generates first data at the first physical layer device by demodulating the set of modulated carrier signals (received at operation 502). For some embodiments, demodulating the set of modulated carrier signals comprises cross-correlating each individual modulated carrier signal in the set of modulated carrier signals with a predetermined sequence of symbols. As described herein, the predetermined sequence of symbols can comprise, for example, a PRBS (e.g., PRBS8). For some embodiments, the first physical layer device comprises a filter (e.g., down-sampling filter), and the cross-correlating is performed by the filter. Additionally, for some embodiments, the filter operates with no (or partial) equalization and/or echo cancellation.

According to some embodiments, cross-correlating each individual modulated carrier signal in the set of modulated carrier signals with the predetermined sequence of symbols comprises, for each individual modulated carrier signal in the set of modulated carrier signals: for each given symbol in the individual modulated carrier signal: multiplying the given symbol by a corresponding symbol in the predetermined sequence of symbols to generate a product value; and adding the product value to an accumulated value for the individual modulated carrier signal. Eventually, based on the accumulated value for the individual modulated carrier signal, some embodiments determine whether the individual modulated carrier signal is carrying a data bit of zero of the first data or a data bit of one of the first data. For instance, as described with respect to FIG. 3, where cross-correlation of the predetermined sequence of symbols of the carrier signal with the modulated carrier signal results in a +5 value, the modulated carrier signal can be determined to carry a data bit of 0. Where cross-correlation of the predetermined sequence of symbols of the carrier signal with the modulated carrier signal results in a −5 value, the modulated carrier signal can be determined to carry a data bit of 1.

Figure 6:
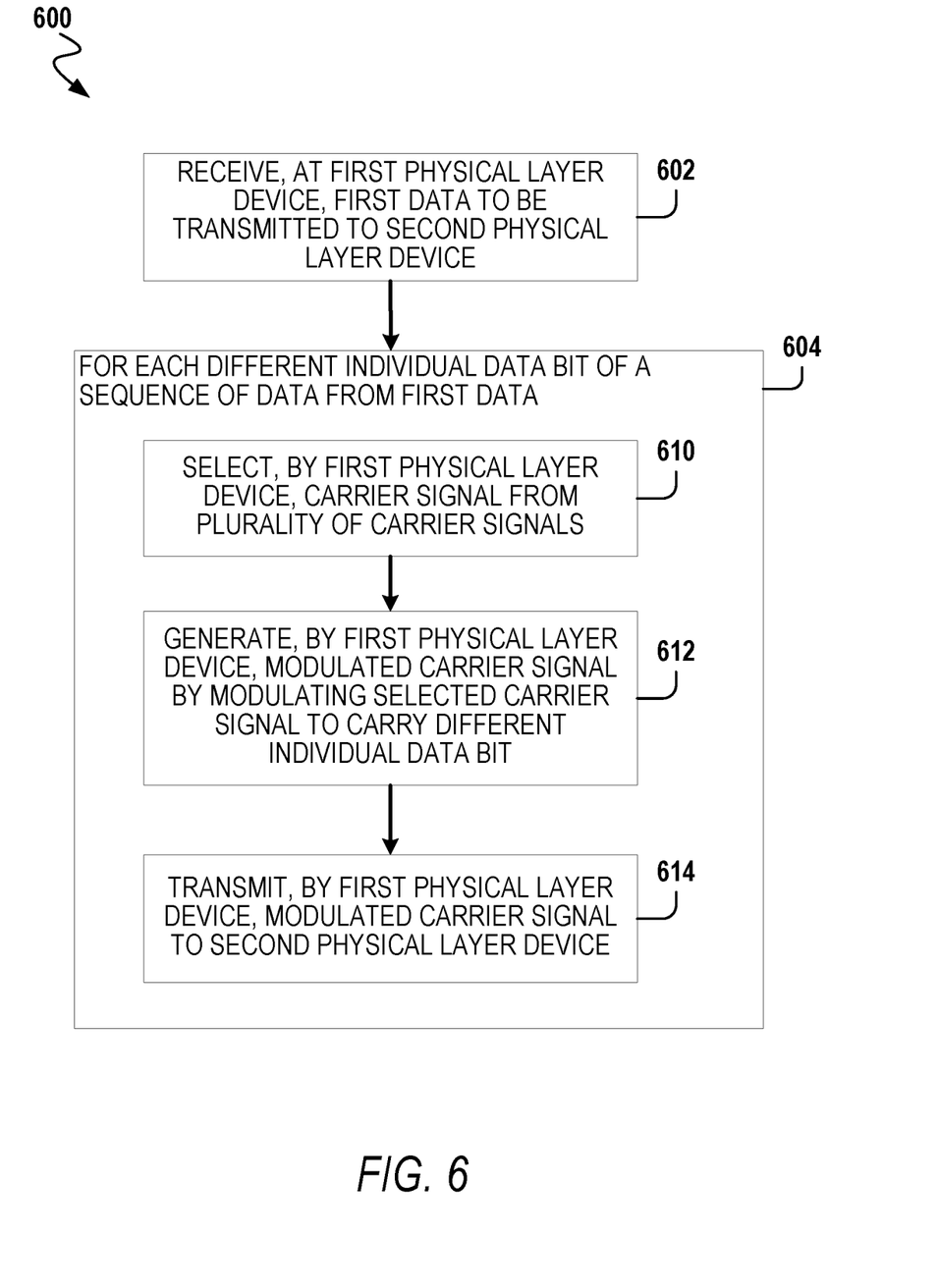
FIGS. 6 and 7 are flowcharts illustrating example methods for data transmission using a plurality of modulated carrier signals to implement code multiplexing, in accordance with some embodiments.
Figure 7:
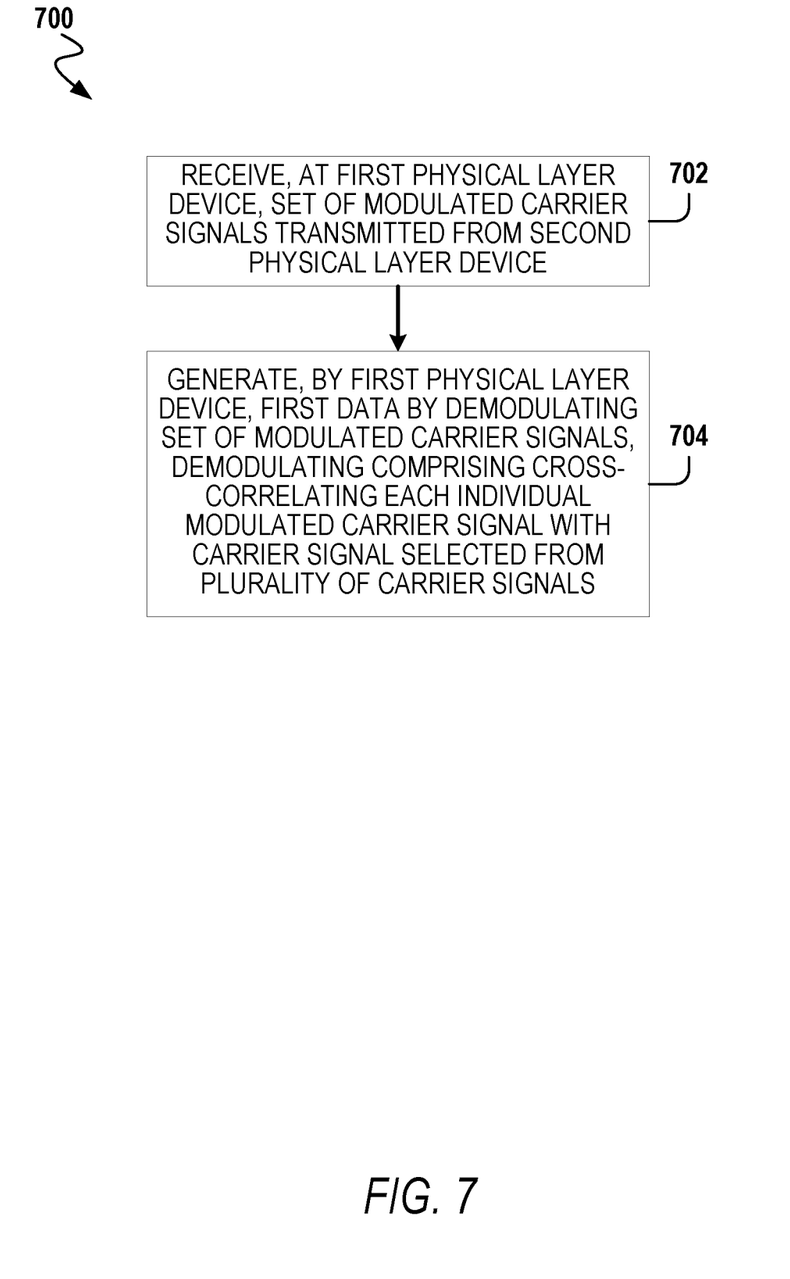

FIGS. 6 and 7 are flowcharts illustrating example methods 600, 700 for data transmission using a plurality of modulated carrier signals to implement code multiplexing, in accordance with some embodiments. As described herein, it will be understood that example methods described herein may be performed by various circuit components, including for example addition circuits, comparators, slicers, DACs), ADCs, delay components, feed-forward equalizers, echo cancellers, crosstalk cancellers, wrap components, precoders, DFEs and the like. The methods 600, 700 may be performed by the first physical (PHY) layer device 112 or the second physical (PHY) layer device 122 described with respect to FIG. 1. Depending on the embodiment, an operation of an example method described herein may involve intervening operations not shown. Additionally, though the operations of example methods may be depicted and described in a certain order, the order in which the operations are performed may vary among embodiments, including performing certain operations in parallel.

Referring now to FIG. 6, at operation 602, a first physical layer device (e.g., 112) receives first data to be transmitted to a second physical layer device (e.g., 122) over a data transmission medium. For some embodiments, the first data comprises user data or application data, such as sensor data generated by a sensor device (e.g., camera senor). In certain applications, the second physical layer device can be associated with (e.g., coupled or form a part of) a sensor device, and the first physical layer device can be associated with (e.g., coupled or form a part of) a sensor data aggregator device. Where the second device 104 comprises a sensor device, the first data to be transmitted to the second physical layer device can comprise sensor control data for the sensor device.

Continuing with operation 604, operations 610 through 614 are performed for each different individual bit, of a sequence of data, from the first data that was received at operation 602. The sequence of data can comprise some (e.g., subset) or all of the first data to be transmitted to the second physical layer device, depending on the size of the first data and a number of carrier signals available in a plurality of carrier signals used by the method 600. For instance, if there are 128 different carrier signals for use in the plurality of carrier signals, after using the 128 different carrier signals to send 128 bits (e.g., 128 bit sequence of data) of the first data, an embodiment can reuse the 128 different carrier signals to send the next 128 bits of the first data.

At operation 610, the first physical layer device (e.g., 112) selects a carrier signal from a plurality of carrier signals, where each individual carrier signal of the plurality of carrier signals comprises a different predetermined sequence of symbols, and where the plurality of carrier signals being known by the second physical layer device. For some embodiment, operation 610 comprises selecting the carrier signal from the plurality of carrier signals based on an order that is known by both the first physical layer device and the second physical layer device. By knowing this order, the second physical layer device receiving the modulated carrier signal can know which carrier signal, from the plurality of carrier signals, to use to demodulate the received signal and extract the different individual data bit on the second physical layer device. The plurality of carrier signals can be implemented in order as an ordered plurality of carrier signals. For some embodiments, the plurality of carrier signals comprises a predetermined sequence of symbols, such as a long PRBS (e.g., PRBS33), where each consecutive frame (e.g., each consecutive 125-bit long frame or subsequence in PRBS33) of the predetermined sequence of symbols is used as a different carrier signal in the plurality of carrier signals. Additionally, the order of the consecutive frames of the generated predetermined sequence of symbols can determine the order in which the consecutive frames are used as different carrier signals. The generation of the predetermined data pattern at both the transmitter and receiver can be synchronous.

According to some embodiments, the method 600 can further comprise an operation (not shown) where the first physical layer device generates the predetermined sequence of symbols. This generation can be synchronized with generation of the same predetermined sequence of symbols at the second physical layer device.

At operation 612, the first physical layer device (e.g., 112) generates a modulated carrier signal based on the different individual data bit by modulating the selected carrier signals to carry the different individual data bit (currently being operated upon by operation 604).

Eventually, at operation 614, the first physical layer device (e.g., 112) transmits the modulated carrier signal to the second physical layer device (e.g., 122). For some embodiments, the modulated carrier signal is transmitted as a high frequency signal. Additionally, for some embodiments, operations 612 and 614 can be performed as a single operation.

Referring now to FIG. 7, at operation 702, a first physical layer device (e.g., 112) receives a set of modulated carrier signals transmitted from a second physical layer device (e.g., 112).

Continuing with operation 704, the first physical layer device (e.g., 122) generates first data at the first physical layer device by demodulating the set of modulated carrier signals (received at operation 702). For some embodiments, demodulating the set of modulated carrier signals comprises cross-correlating each individual modulated carrier signal in the set of modulated carrier signals with a carrier signal selected from a plurality of carrier signals used by the second physical layer device. As described herein, for some embodiments, the first physical layer device is aware of the plurality of carrier signals being used by the second physical layer device, and is also aware of the order in which the second physical layer device selects and uses different carrier signals (from the plurality of carrier signals) to carry different individual data bits being transmitted from the second physical layer device to the first physical layer device.

Figure 8:
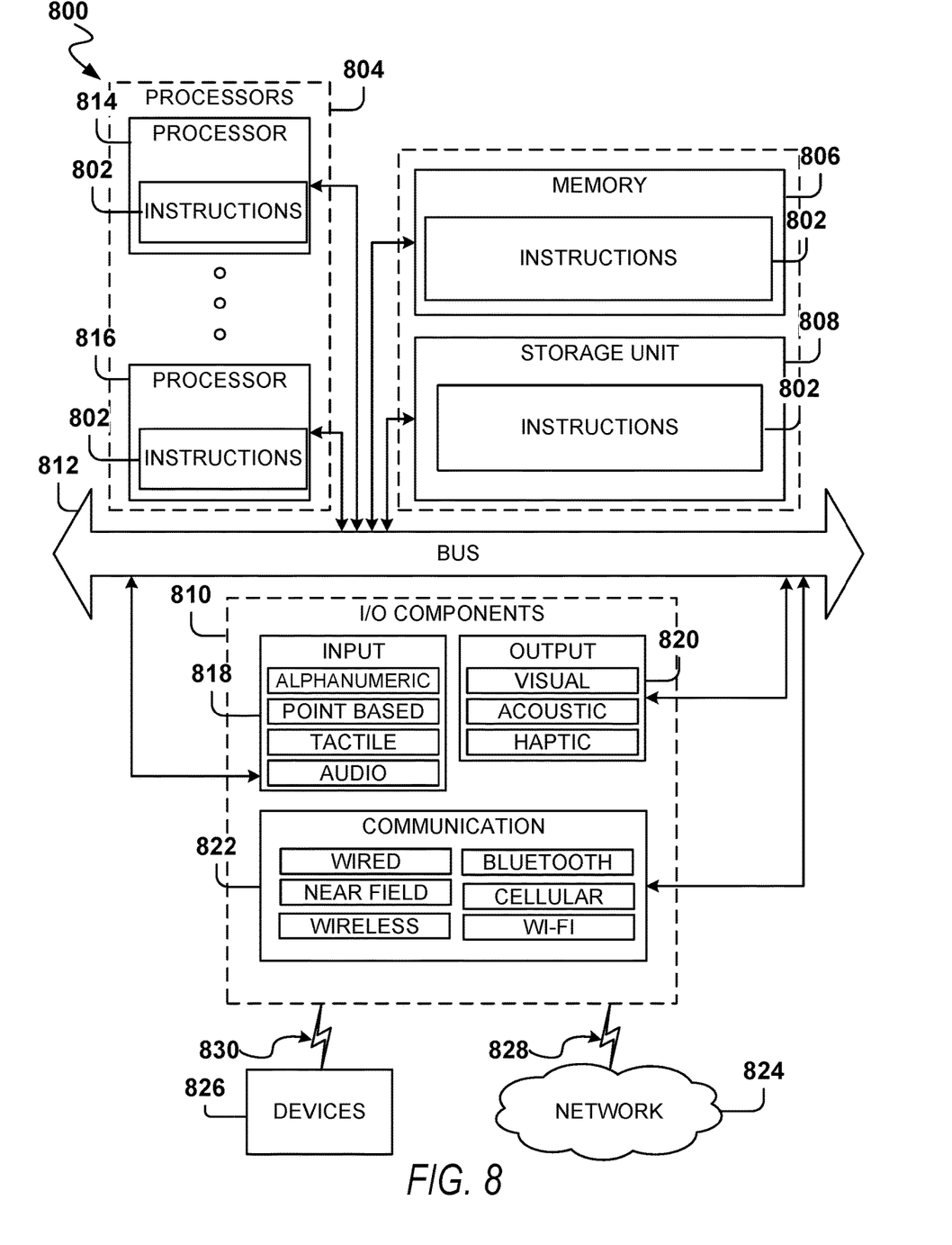
FIG. 8 is a block diagram illustrating components of an example machine that can use one or more embodiments discussed herein.

FIG. 8 is a block diagram illustrating components of an example machine 800 that can use one or more embodiments discussed herein. Specifically, FIG. 8 shows a diagrammatic representation of the machine 800 in the example form of a system, within which instructions 802 (e.g., software, a program, an application, an applet, an app, a driver, or other executable code) for causing the machine 800 to perform one or more operations that may make use of one or more of the methodologies discussed herein. For example, the instructions 802 include executable code that causes the machine 800 to execute one or more operations that cause a physical (PHY) layer device of the machine 800 (e.g., embodied by communication components 822) to perform the method 400, 500, 600 or 700. The machine 800 may be coupled (e.g., networked) to other machines. Depending on the embodiment, the machine 800 can implement at least some portion of the first device 102 or the second device 104.

By way of non-limiting example, the machine 800 may comprise or correspond to a television, a computer (e.g., a server computer, a client computer, a personal computer (PC), a tablet computer, a laptop computer, or a netbook), a personal digital assistant (PDA), a smart phone, a mobile device, or any machine capable of executing the instructions 802, sequentially or otherwise, that specify actions to be taken by the machine 800. Further, while only a single machine 800 is illustrated, the term "machine" shall also be taken to include a collection of machines 800 that individually or jointly execute the instructions 802.

The machine 800 may include processors 804, memory 806, a storage unit 808, and I/O components 810, which may be configured to communicate with each other such as via a bus 812. In some embodiments, the processors 804 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 814 and a processor 816 that may execute the instructions 802. The term "processor" is intended to include multi-core processors 804 that may comprise two or more independent processors (sometimes referred to as "cores") that may execute instructions 802 contemporaneously. Although FIG. 8 shows multiple processors 804, the machine 800 may include a single processor with a single core, a single processor with multiple cores (e.g., a multi-core processor), multiple processors with a single core, multiple processors with multiple cores, or any combination thereof.

The memory 806 (e.g., a main memory or other memory storage) and the storage unit 808 are both accessible to the processors 804 such as via the bus 812. The memory 806 and the storage unit 808 store the instructions 802. The instructions 802 may also reside, completely or partially, within the memory 806, within the storage unit 808, within at least one of the processors 804 (e.g., within the processor's cache memory), or any suitable combination thereof, during execution thereof by the machine 800. Accordingly, the memory 806, the storage unit 808, and the memory of the processors 804 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 802. The term "machine-readable medium" shall also be taken to include any medium, or combination of multiple media, that is capable of storing instructions (e.g., instructions 802) for execution by a machine (e.g., machine 800), such that the instructions, when executed by one or more processors of the machine (e.g., processors 804), cause the machine to perform one or more operations that makes use of one or more of the methodologies described herein (e.g., the method 400, 500, 600 or 700). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 810 may include a wide variety of components to receive input, provide output, produce output, transmit information, exchange information, capture measurements, and so on. The specific I/O components 810 that are included in a particular machine 800 will depend on the type of the machine 800. For example, portable machines such as mobile phones will likely include a touch input device or other such input mechanisms, while a headless server machine will likely not include such a touch input device. It will be appreciated that the I/O components 810 may include many other components that are not specifically shown in FIG. 8. The I/O components 810 are grouped according to functionality merely for simplifying the following discussion and the grouping is in no way limiting. In various embodiments, the I/O components 810 may include input components 818 and output components 820. The input components 818 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components, and the like. The output components 820 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 810 may include communication components 822 operable to couple the machine 800 to a network 824 or devices 826 via a coupling 828 and a coupling 830 respectively. For example, the communication components 822 may include a network interface component or another suitable device to interface with the network 824. In further examples, the communication components 822 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 826 may be another machine or any of a wide variety of peripheral devices. According to various embodiments, the communication components 822 can include a transceiver described herein, a receiver described herein, or both.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be ab sent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A system comprising:
   a first physical layer device configured to communicate data with a second physical layer device over a data transmission medium, the first physical layer device being further configured to perform operations comprising:
   receiving first data to be transmitted to the second physical layer device;
   generating a set of modulated carrier signals based on the first data by modulating each individual carrier signal in a set of carrier signals to carry a different individual data bit of the first data, each individual carrier signal in the set of carrier signals comprising a predetermined sequence of symbols, and the predetermined sequence of symbols being known by the second physical layer device; and
   transmitting the set of modulated carrier signals to the second physical layer device.

2. The system of claim 1, wherein the modulating each individual carrier signal in the set of carrier signals to carry the different individual data bit of the first data comprises:
   modifying an individual predetermined sequence of symbols, of the individual carrier signal, based on whether the individual predetermined sequence of symbols is to carry an individual data bit of zero from the first data or an individual data bit of one from the first data.

3. The system of claim 2, wherein the modifying the individual predetermined sequence of symbols, of the individual carrier signal, based on whether the individual predetermined sequence of symbols is to carry the individual data bit of zero from the first data or the individual data bit of one from the first data comprises:
   determining whether the individual predetermined sequence of symbols is to carry the individual data bit of zero from the first data or the individual data bit of one from the first data; and
   in response to the determining that the individual predetermined sequence of symbols is to carry the individual data bit of zero, leaving the individual predetermined sequence of symbols unmodified.

4. The system of claim 2, wherein the modifying the individual predetermined sequence of symbols, of the individual carrier signal, based on whether the individual predetermined sequence of symbols is to carry the individual data bit of zero from the first data or the individual data bit of one from the first data comprises:
   determining whether the individual predetermined sequence of symbols is to carry the individual data bit of zero from the first data or the individual data bit of one from the first data; and
   in response to the determining that the individual predetermined sequence of symbols is to carry the individual data bit of zero, modifying the individual predetermined sequence of symbols.

5. The system of claim 2, wherein the modifying the individual predetermined sequence of symbols, of the individual carrier signal, based on whether the individual predetermined sequence of symbols is to carry the individual data bit of zero from the first data or the individual data bit of one from the first data comprises:
   determining whether the individual predetermined sequence of symbols is to carry the individual data bit of one from the first data or the individual data bit of one from the first data; and
   in response to the determining that the individual predetermined sequence of symbols is to carry the individual data bit of one, leaving the individual predetermined sequence of symbols unmodified.

6. The system of claim 2, wherein the modifying the individual predetermined sequence of symbols, of the individual carrier signal, based on whether the individual predetermined sequence of symbols is to carry the individual data bit of zero from the first data or the individual data bit of one from the first data comprises:
   determining whether the individual predetermined sequence of symbols is to carry the individual data bit of one from the first data or the individual data bit of one from the first data; and
   in response to the determining that the individual predetermined sequence of symbols is to carry the individual data bit of one, modifying the individual predetermined sequence of symbols.

7. The system of claim 2, wherein the modifying the individual predetermined sequence of symbols comprises reversing a polarity of the individual predetermined sequence of symbols.

8. The system of claim 2, wherein the modifying the individual predetermined sequence of symbols comprises multiplying the individual predetermined sequence of symbols by a negative value.

9. The system of claim 1, wherein the predetermined sequence of symbols comprises a pseudo-random binary sequence (PRBS).

10. The system of claim 1, wherein the first physical layer device comprises:

an echo canceller comprising a set of poly-phase filters, the set of poly-phase filters operating based on a set of coefficients.

11. A method comprising:

receiving, at a first physical layer device, first data to be transmitted to a second physical layer device over a data transmission medium;

generating, by the first physical layer device, a set of modulated carrier signals based on the first data by modulating each individual carrier signal in a set of carrier signals to carry a different individual data bit of the first data, each individual carrier signal in the set of carrier signals comprising a predetermined sequence of symbols, and the predetermined sequence of symbols being known by the second physical layer device; and transmitting, by the first physical layer device, the set of modulated carrier signals to the second physical layer device.

12. The method of claim 11, wherein the modulating each individual carrier signal in the set of carrier signals to carry the different individual data bit of the first data comprises:

modifying an individual predetermined sequence of symbols, of the individual carrier signal, based on whether the individual predetermined sequence of symbols is to carry an individual data bit of zero from the first data or an individual data bit of one from the first data.

13. The method of claim 12, wherein the modifying the individual predetermined sequence of symbols, of the individual carrier signal, based on whether the individual predetermined sequence of symbols is to carry the individual data bit of zero from the first data or the individual data bit of one from the first data comprises:

determining whether the individual predetermined sequence of symbols is to carry the individual data bit of zero from the first data or the individual data bit of one from the first data; and in response to the determining that the individual predetermined sequence of symbols is to carry the individual data bit of zero, leaving the individual predetermined sequence of symbols unmodified.

14. The method of claim 12, wherein the modifying the individual predetermined sequence of symbols, of the individual carrier signal, based on whether the individual predetermined sequence of symbols is to carry the individual data bit of zero from the first data or the individual data bit of one from the first data comprises:

determining whether the individual predetermined sequence of symbols is to carry the individual data bit of zero from the first data or the individual data bit of one from the first data; and in response to the determining that the individual predetermined sequence of symbols is to carry the individual data bit of zero, modifying the individual predetermined sequence of symbols.

15. The method of claim 12, wherein the modifying the individual predetermined sequence of symbols, of the individual carrier signal, based on whether the individual predetermined sequence of symbols is to carry the individual data bit of zero from the first data or the individual data bit of one from the first data comprises:

determining whether the individual predetermined sequence of symbols is to carry the individual data bit of one from the first data or the individual data bit of one from the first data; and in response to the determining that the individual predetermined sequence of symbols is to carry the individual data bit of one, leaving the individual predetermined sequence of symbols unmodified.

16. The method of claim 12, wherein the modifying the individual predetermined sequence of symbols, of the individual carrier signal, based on whether the individual predetermined sequence of symbols is to carry the individual data bit of zero from the first data or the individual data bit of one from the first data comprises:

determining whether the individual predetermined sequence of symbols is to carry the individual data bit of one from the first data or the individual data bit of one from the first data; and in response to the determining that the individual predetermined sequence of symbols is to carry the individual data bit of one, modifying the individual predetermined sequence of symbols.

17. The method of claim 12, wherein the modifying the individual predetermined sequence of symbols comprises reversing a polarity of the individual predetermined sequence of symbols.

18. The method of claim 12, wherein the modifying the individual predetermined sequence of symbols comprises multiplying the individual predetermined sequence of symbols by a negative value.

19. The method of claim 11, wherein the predetermined sequence of symbols comprises a pseudo-random binary sequence (PRBS).

20. The method of claim 11, wherein the first physical layer device comprises:

an echo canceller comprising a set of poly-phase filters, the set of poly-phase filters operating based on a set of coefficients.

* * * * *